INVENTORS
Erwin C. Weiblen
BY Irving W. Doile
ATTORNEYS

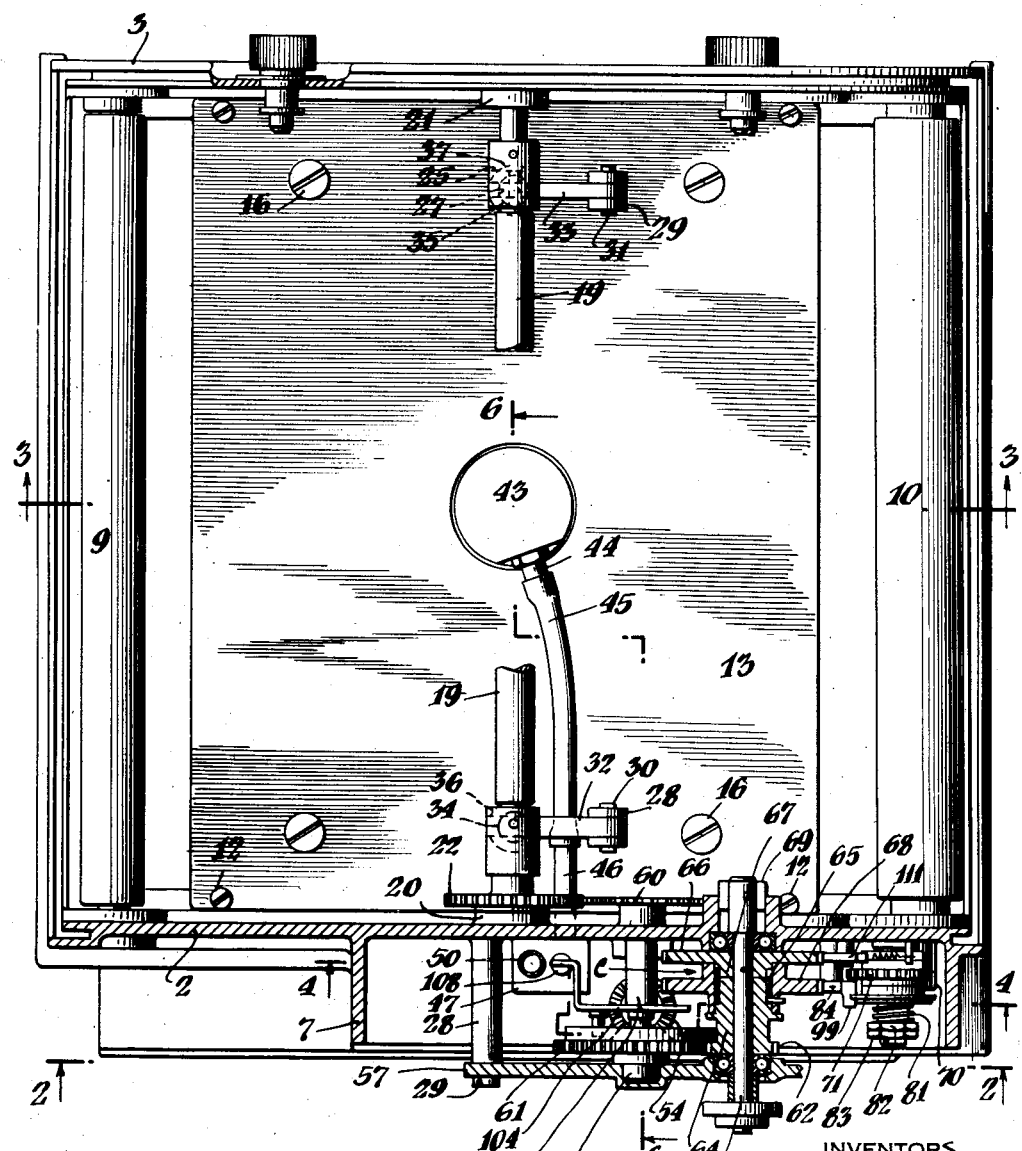

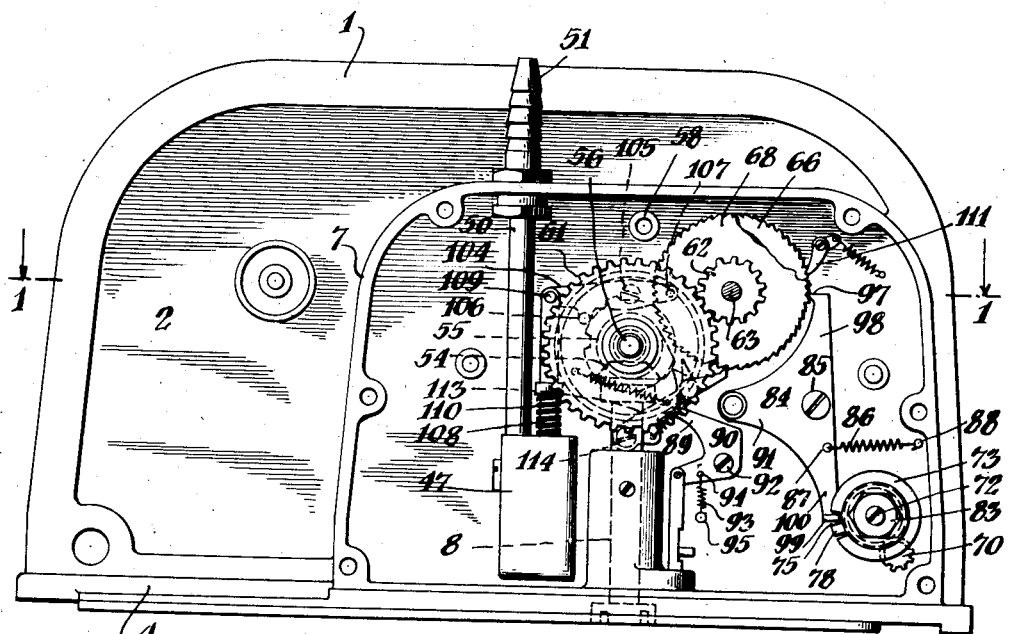
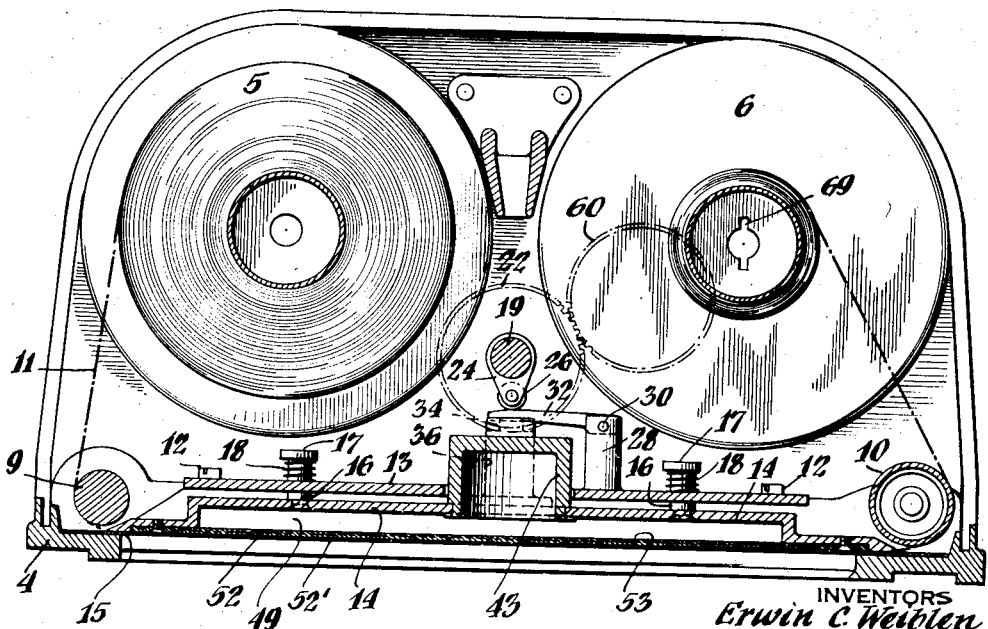

Oct. 4, 1938.　　E. C. WEIBLEN ET AL　　2,131,926
CAMERA MAGAZINE
Filed May 5, 1937　　4 Sheets-Sheet 4

INVENTORS
Erwin C. Weiblen
BY Irving W. Doile
August, Meary & Campbell
ATTORNEYS Patented Oct. 4, 1938

2,131,926

UNITED STATES PATENT OFFICE 2,131,926

CAMERA MAGAZINE

Erwin C. Weiblen, Woodside, Long Island, and Irving W. Doyle, Amityville, N. Y., assignors to Fairchild Aerial Camera Corporation, Woodside, Long Island, N. Y., a corporation of New York Application May 5, 1937, Serial No. 140,780

17 Claims. (Cl. 95—34)

This invention relates to film magazines for cameras and has particular reference to mechanism for automatically advancing and positioning the correct amount of film for exposure, together with safety devices for insuring proper sequence of operations.

In former mechanisms of this nature, the film has been held flat in the focal plane of the camera by means of a mechanically-operated pressure plate pressing the film against a glass plate, or by a differential pressure means. The mechanism of the first-named case is objectionable, because light from the object to be photographed must pass through the glass plate, whereby considerable light is absorbed and a certain amount of image distortion also results. In addition, the film is marred or otherwise damaged by scratching as it is advanced, due to contact because of the lack of proper clearance between the glass plate and the pressure plate. In the second-named case, the glass plate is eliminated and a movable positioning plate is provided to hold the film firmly against the vacuum back, which holds the film flat by suction. Film scratching also occurs in this arrangement as the film is advanced, and no satisfactory means has been provided for automatically moving the positioning plate.

In accordance with the present invention a fixed positioning plate is provided and a movable vacuum back pressure plate cooperates therewith to hold the film flat. The movement of the pressure plate is made of sufficient extent so that by the use of suitably positioned guide rollers for the film it does not touch either the positioning plate or the vacuum back of the pressure plate as it is advanced. The movable vacuum back pressure-plate, the film-advancing means, the film metering means, the vacuum back valve, etc., all operate in synchronism by interconnections and synchronism is positively assured by the incorporation of proper safety devices.

It will be seen that the apparatus of the present invention provides many advantages over the prior devices and is simple and fool-proof in construction.

As described herein, the invention is shown as applied to the well-known Fairchild type of camera magazine, but it is to be understood, however, that the invention is not limited to use with that camera, but may be used in any type of camera.

For a more complete understanding of the invention, reference may be had to the accompanying drawings, in which:

Figure 1 is a horizontal section through the camera magazine of this invention, as seen along the line 1—1 of Fig. 2;

Fig. 2 is a side view of the magazine, as seen along the line 2—2 of Fig. 1, with the cover plate of the mechanism casing removed to show the interior thereof;

Fig. 3 is a vertical section through the magazine, as seen along the line 3—3 of Fig. 1;

Figure 6:
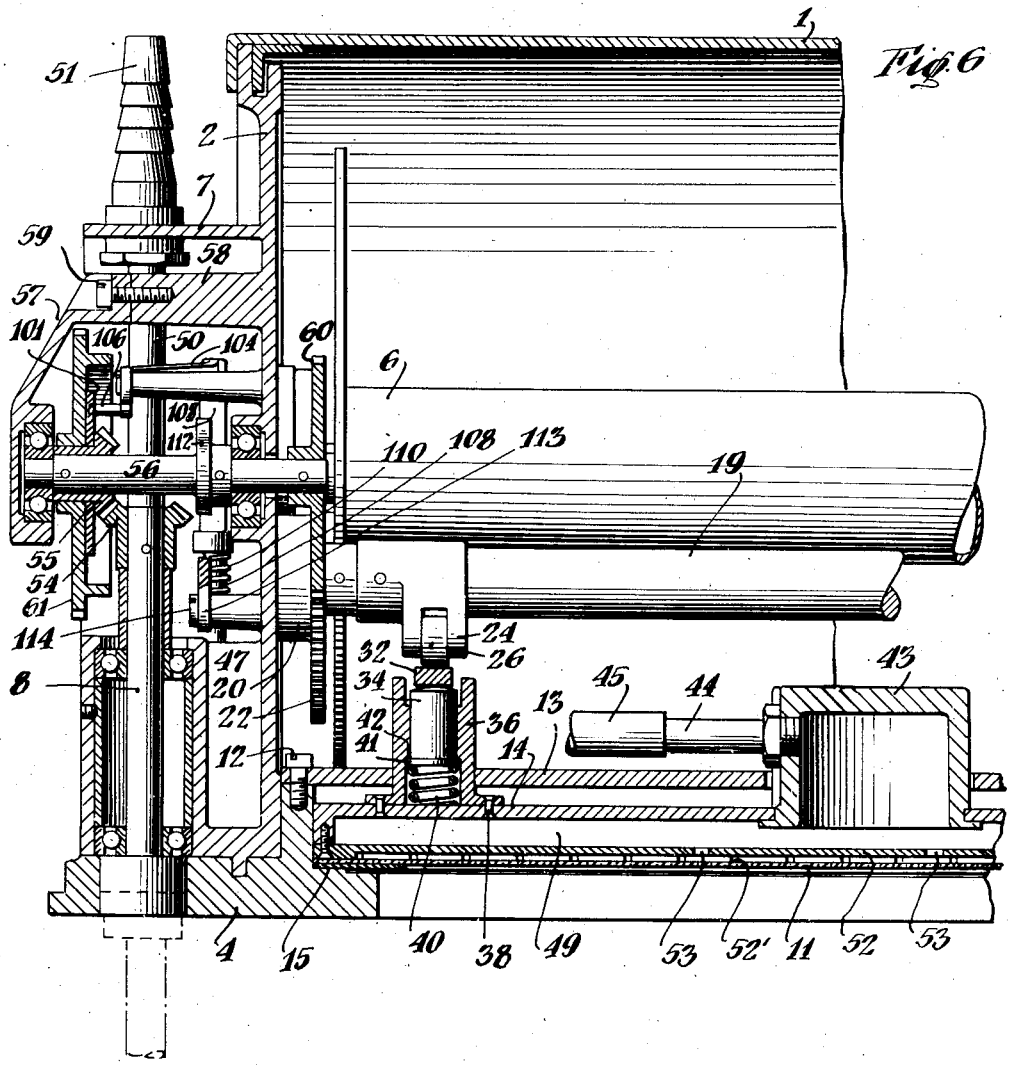
Fig. 6 is a transverse vertical section through the mechanism as seen along the line 6—6 of Fig. 1.

Referring to Figs. 2 and 6, the magazine is provided with a removable light-tight cover 1 forming the top and two sides of the magazine. The side plates 2 and 3 are mounted on the base plate 4 of the magazine and the majority of the magazine mechanism is supported by the plates 2 and 3. As shown particularly in Fig. 3, the film storage spool 5 and the film take-up spool 6 are journalled between the plates 2 and 3 in any suitable manner, the latter spool being driven by mechanism within the casing 7 fixed to the plate 2. This mechanism, to be described, is adapted to be actuated by the camera winding mechanism, not shown, which is detachably coupled to the shaft 8 in any suitable manner, as indicated by dotted lines in Fig. 6. The film 11 passes from spool 5 to spool 6 over film-positioning rollers 9 and 10, journalled between plates 2 and 3, and also between the movable pressure plate 14 and film-positioning plate 15. Rollers 9 and 10 are so positioned that as the pressure plate 14 is raised, the film 11 assumes a mid-position between the pressure plate 14 and the film-positioning plate 15 so as not to engage either one. Thus, when the film 11 is advanced it is not marred or scratched by contact.

Fixed to the base plate 4 by screws 12 is a plate 13 adapted to support the movable pressure plate 14 by means of stud bolts 16 fixed at one end to the pressure plate 14 and projecting through the plate 13. Interposed between the heads 17 of the bolts 16 and plate 13 are springs 18 which urge the pressure plate 14 toward raised position. Pressure plate 14 is normally in the raised position and therefore out of contact with film 11 and positioning plate 15 mounted on base plate 4, as shown in Figs. 3 and 6. With this construction, when the pressure plate 14 is released, springs 18 move it upwardly and away from the film 11 and positioning plate 15. Springs 18 also serve as pressure equalizing means for the pressure plate 14 when it is moved against the film 11.

As shown in Figs. 1 and 6, a shaft 19 is journalled at its ends in plates 2 and 3 at 20 and 21, and is provided with lateral arms 24 and 25 having at their free ends the rollers 26 and 27, which engage respective levers 32 and 33 pivotally mounted on posts 28 and 29 secured to plate 13. The free ends of levers 32 and 33 engage respective plungers 34 and 35 loosely mounted in the respective housings 36 and 37 projecting through plate 13 and mounted on the pressure plate 14 by means of rivets 38. Springs 40 are interposed between the pressure plate 14 and the plungers 34 and 35, which are retained within their housings 36 and 37 by means of end flanges 41 cooperating with shoulders 42 in the housings 36 and 37.

The rollers 26 and 27 are normally out of engagement with levers 32 and 33 and the pressure plate 14 is in the raised position. As shaft 19 is rotated, the rollers 26 and 27 engage levers 32 and 33, which serve as means to exert a uniform force on the plungers 34 and 35. As this force is applied to plungers 34 and 35 and therefore to springs 40, which are under sufficient tension not to be further compressed under the initial force exerted by rollers 26 and 27, plungers 34 and 35, casings 36 and 37, and springs 40 move downwardly as a unit under the force exerted thereon and, since casings 36 and 37 are fixed to the pressure plate 14, the latter moves the film 11 against positioning plate 15. However, at this point arms 24 and 25 with their rollers 26 and 27 have not reached their maximum position, but continue to move to compress the springs 40, thus exerting a final force on the pressure plate 14 to complete an air-tight connection between the film 11 and the edges of the pressure plate 14.

The interior of the pressure plate 14 communicates with an air chamber 43 mounted thereon and fitted with a nipple 44, connected by flexible tube 45 to another nipple 46 on another air chamber 47 housed in casing 7 and connected through passage tube 50 and nipple 51 to an outside source of suction. A valve 48 in chamber 47, adapted to be opened and closed in proper timed relationship by means to be described, controls the suction in the air chamber 49 of the pressure plate 14. The face 52 of the pressure plate 14 is provided with grooves 52' having ports 53 leading thereto from air chamber 49. This structure constitutes the vacuum back of pressure plate 14, and as the air pressure in chamber 49 is reduced by opening valve 48, a uniform reduction in air pressure will occur between the face 52 of pressure plate 14 and the film 11 so that the atmospheric pressure on the outer surface of the film 11 will force it against the face 52 of the pressure plate 14 and thus cause it to lie perfectly flat thereon.

The winding mechanism coupled to shaft 8, a part of which is shown by dotted lines in Fig. 6, forms no part of the present invention, and may be of the type described in Patent No. 1,817,182 to Sherman M. Fairchild, or of any other suitable type. By means of this winding mechanism, shaft 8 is caused to make exactly one revolution for each winding operation. Fixed to the shaft 8 within casing 7 is a bevel gear 54 meshing with another bevel gear 55 fixed to horizontal shaft 56, which is journalled at one end in the side plate 2 and at its other end in a cover plate 57 detachably connected to studs 58 on plate 2 by means of screws 59, as shown particularly in Fig. 6. To the end of shaft 56 projecting through plate 2 is fixed a gear 60 meshing with a gear 22 mounted on the shaft 19, for actuating the pressure plate 14 in the manner described.

Also fixed to the shaft 56 is a gear 61 meshing with a gear 62 which is loosely mounted on the shaft 63 journalled in plates 2 and 57. Gear 62 is provided with a hub 64 which carries the flat cut spring 65 of a clutch mechanism generally indicated C in Fig. 1. Pinned to the shaft 63 is a ratchet 66 provided with a hub 67 which abuts the hub 64. Spring 65 also extends over the hub 67, there being a very close fit between the spring and the hubs, and it is coiled in a counter-clockwise direction with one end thereof connected to a second ratchet 68 secured to ratchet 66. The inner end of shaft 63 is provided with a key 69 adapted to engage in a slot in the film-winding spool 16. Thus, when gear 62 is rotated clockwise and ratchet gear 68 is free to rotate, spring 65 is tightened on the hubs 64 and 67 with a snubbing action, rotating ratchet 66 and therefore shaft 63 and spool 6. In the event ratchet 68 is kept from rotating, by means to be described, the rotation of gear 62 is against the twist of spring 65 and, therefore, the spring 65 releases its grip on the hubs 64 and 67 and ratchet 66 is not rotated.

Figure 4:
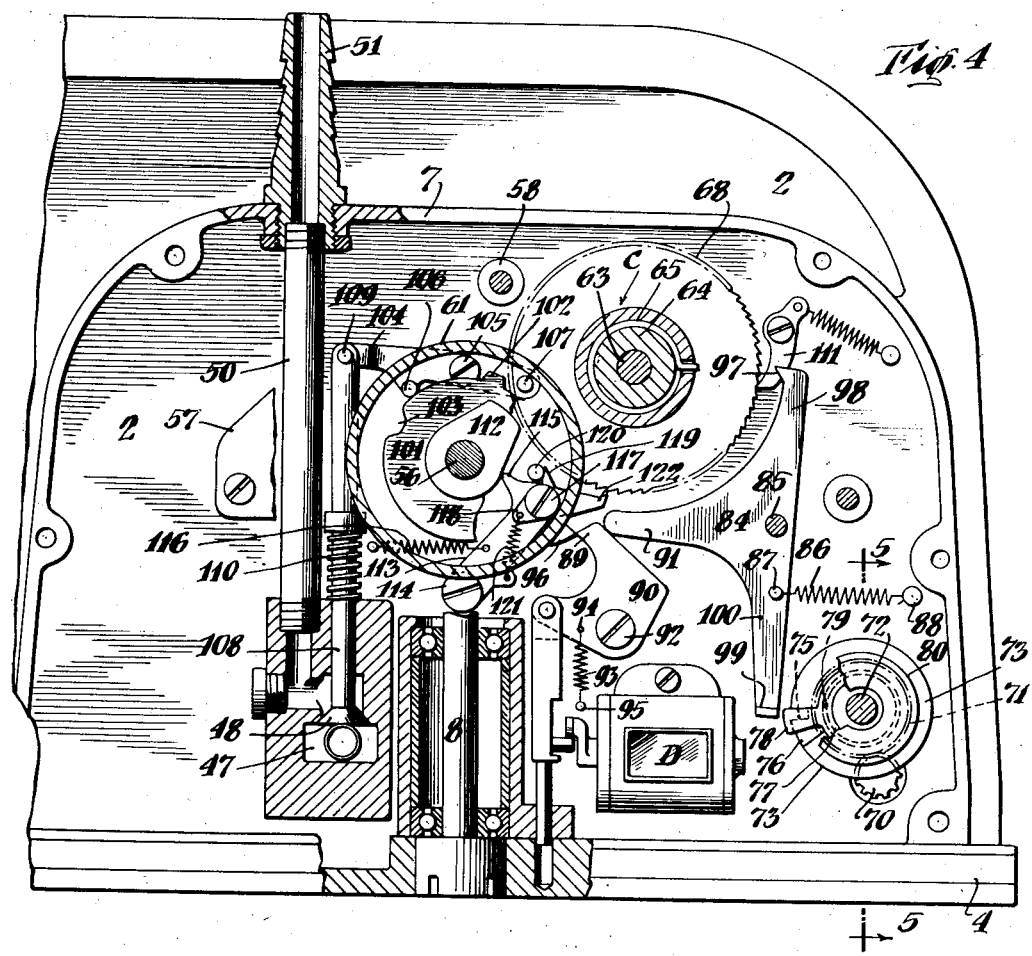
Fig. 4 is an enlarged vertical section through the mechanism, as seen along the line 4—4 of Fig. 1.
Figure 5:
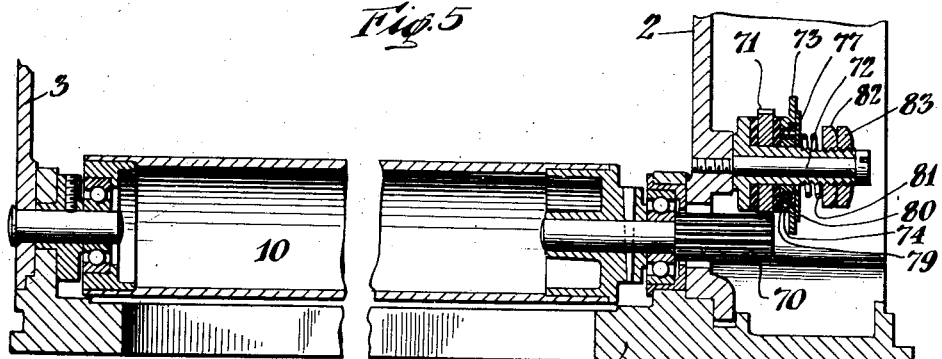
Fig. 5 is a vertical section through a portion of the film advancing and positioning means, as seen along the line 5—5 of Fig. 4.

In order to advance the correct amount of film 11 for each exposure, means must be provided to stop the rotation of spool 6 at the proper instant. Positioning roller 10 is also used to actuate a film metering means including a pinion 70 mounted on the roller 10 meshing with a gear 71 loosely mounted on a stub shaft 72 secured to plate 2, as shown in Figs. 4 and 5. Fixed to the gear 71 is a disc 73 provided with a recessed portion 74, a slot 75, and a recess 76 in its periphery. A disc 77 is mounted within the recess 74 in disc 73 and is provided with a projection 78 adapted to normally cover the slot 75 of disc 73. Disc 77 is maintained in this position by the action of a spring 79 fixed at one end to the disc 73 and at its other end to the disc 77. The entire assembly is held in proper relationship by a washer 80, spring 81 and lock nuts 82 and 83.

As illustrated particularly in Figs. 4 and 5, a link 84 is pivoted at 85 and is urged in a counter-clockwise direction by a spring 86 connected at one end to a pin 87 thereon and to the plate 2 at 88. As shown in Fig. 4 the end 91 of link 84 is engaged by arm 89 of link 90, which is pivoted at 92 and is normally in the position shown in Fig. 2, due to the action of spring 93 connected to link 90 at 94 and to the plate 2 at 95. In the position illustrated in Fig. 2, arm 89 of link 90 lies in the path of the projection 96 (Fig. 4) on the gear 61. Therefore, as gear 61 is rotated, projection 96 engages arm 89, causing link 90 and therefore link 84 to rotate clockwise to the position shown in Fig. 4. In this position, the dog 97 of link 84 is out of engagement with the ratchet 68 and projection 99 of arm 100 thereof is out of engagement with slot 75 of disc 73, whereas projection 78 of disc 77 covers slot 75, spring 79 having rotated disc 77 clockwise. Since ratchet 68 is free, film spool 6 is rotated as hereinbefore explained and, therefore, film 11 is advanced. Positioning roller 10 is rotated as the film is drawn over it and consequently disc 73 is rotated by means of the gear train previously described.

As the winding operation continues, gear 61 continues to rotate and projection 96 thereof moves past and releases arm 89 of link 90 which is then rotated counter-clockwise by spring 93. This movement of link 90 releases link 84, which is also rotated counter-clockwise by spring 86 until projection 99 rests against the periphery of rotating disc 73. Projection 99 cannot drop in slot 75 at this time as the latter is covered by the projection 78 of disc 77, which holds the link 84 away from ratchet 68 so that dog 97 cannot engage it, thereby permitting spool 6 to continue to rotate. Disc 77 also continues its rotation until projection 78 strikes projection 99, thus uncovering slot 75 and allowing projection 99 to drop into it. This permits an additional counterclockwise rotation of link 84 by its spring 86 to effect engagement of dog 97 with ratchet 68. In this way, the spring clutch C is disengaged and the film advancement is halted after the correct amount has been moved into the focal plane as determined by disc 73, which is limited to one complete revolution.

Gear 61 continues to rotate, and since shaft 19 is directly geared to it, it also continues to rotate until arms 24 and 25 thereon contact respective arms 32 and 33 to force the pressure plate 14 downwardly as described, which takes place immediately after the film has been positioned. When the pressure plate has been completely lowered the rotation of its drive gear 61 is stopped by a clutch mechanism incorporated in the outside winding mechanism and not shown here since it forms no part of this invention. The mechanism remains in this position until another operation is initiated. A spring-actuated dog 111, pivoted on plate 2, as shown in Fig. 4, engages ratchet 66 and thus serves to prevent unwinding of the spool 6 upon completion of the film advancing operation.

Simultaneously with the completion of the downward movement of pressure plate 14, the valve 48 is opened to exhaust the air in chamber 49, whereby the film is forced flatwise against face 52 of pressure plate 14.

The valve 48 is actuated by mechanism including a disc 101 fixed on shaft 56 and provided with a projection 102 and a notch 103. As shown in Fig. 4, a link 104 pivoted at 105 on the plate 2 is provided with two lateral pins 106 and 107 adapted to simultaneously engage projection 102 and notch 103 of disc 101 as the latter rotates counter-clockwise, thus imparting to link 104 a counter-clockwise rotation. Link 104 is pivotally connected to the stem 108 of valve 48 at 109. Thus, as link 104 is rotated, the downward movement of stem 108 opens the valve 48 to exhaust pressure plate chamber 49. As hereinbefore explained, the mechanism at this point comes to rest. Upon the next initial movement of gear 61 and therefore disc 101, pins 106 and 107 move out of engagement with projection 102 and notch 103, closing valve 48, which is then held closed by spring 110 on valve stem 108.

It will be observed that with the mechanism so far described, care must be exercised in loading the camera in order to prevent the mechanism from being out of synchronism with the film. For example, when the camera winding mechanism is started, the pressure plate 14 may be lowered before projection 99 drops into slot 75 to stop the action of clutch C. In order to prevent such an occurrence, a safety means is provided including cam 112 fixed to the shaft 56 and adapted to engage link 113 pivoted at 114 on the plate 2. Link 113 is provided with a lateral projection 115 which is urged into engagement with the cam 112 at all times under the action of spring 116. Pivoted at 117 on the link 113 is another link 118, which is urged counter-clockwise by spring 121 so that its dog 122 engages ratchet 68. In the position shown in Fig. 4, projection 115 is positioned on the low part of cam 112 and, therefore, link 113 has rotated counter-clockwise the maximum distance under the action of spring 116. During this movement, projection 119 of link 118 engages a pin 120 on plate 2 thus rotating link 118 clockwise against the action of spring 121 to disengage the dog 122 from the ratchet 68 and permitting it to be rotated by the clutch C.

Substantially simultaneously with the lowering of pressure plate 14 and opening of valve 48 as described, the high point of cam 112 moves link 113 clockwise, thus disengaging projection 119 from pin 120, permitting spring 121 to rotate link 118 counter-clockwise and engage dog 122 with ratchet 68 to stop its rotation and disengage clutch C. In this manner the movement of the film 11 is always stopped prior to the lowering of the pressure plate, irrespective of the relationship between projection 99 on link 84 with the slot 75 of disc 73.

Generally indicated at D in Fig. 4 is a counting mechanism indicating the number of exposures that have been made. This mechanism is advanced one unit for each complete operation of the camera mechanism by the action of link 90. Since it forms no part of the present invention it need not be further described.

Operation of the camera magazine mechanism of this invention will be readily understood from the foregoing detailed description. By way of brief summary of its operation, the vacuum back pressure plate 14 is in normally raised position and valve 48 is closed at the beginning of a film-advancing operation, so that the film 11 is suspended by positioning rollers 9 and 10 approximately midway between and thus out of contact with pressure plate 14 and the film-positioning plate 15, so that in its subsequent movement the film cannot be scratched by contact with these plates. As the film-winding movement is initiated by the mechanism coupled to shaft 8, the latter is rotated, and its rotation is imparted to gears 61 and 62, clutch C, shaft 63 and spool 6, if ratchet 68 is free to rotate. Freedom of ratchet 68 is determined by engagement between projection 96 on gear 61 with link 90, causing the latter to move link 84 to disengage its dogs 97 from ratchet 68, and also by safety mechanism assuring synchronism between the film and the mechanism.

As link 90 is released by projection 96, spring 86 pulls link 84 counter-clockwise until its end 99 rests against the edge of disc 73, which is rotated by gear 70 on film-positioning roller 10, as the latter is rotated by the advance of film 11 thereover. Disc 73 makes one complete revolution thereafter, when projection 99 is engaged by 78, causing the latter to uncover slot 75 into which 99 drops to allow spring 86 to engage dog 97 with ratchet 68, stopping the advance of the film 11 after a predetermined length thereof has been advanced to exposure position.

If the film is out of synchronism with the mechanism, pawl 122 holds ratchet 68 against film-advancing rotation until pawl 122 is in such position that its projection 119 is engaged by pin 120, which releases it from the ratchet 68, permitting the latter to rotate as described. Cam 112 then holds pawl 122 inoperative until the film-advancing operation is completed. Dog 97 holds ratchet 68 until released by projection 96 and link 90 as described.

Although metered advance of the film 11 is halted, shaft 56 continues to be rotated by shaft 8, and gears 60 and 22 continue to drive shaft 19 and its arms 32 and 33, which move pressure plate 14 downwardly to clamp the film against the film-positioning plate 15. At the completion of that operation, cam 101 on shaft 56 releases lever 104, which opens valve 49 to reduce the pressure in vacuum back chamber 49, causing the film 11 to be pressed flat against the face 52 in readiness for the exposure as shaft 8 stops rotating. Restarting of shaft 8 recloses valve 8 and releases pressure plate 14, and the cycle recommences.

While a preferred embodiment of the invention has been illustrated and described herein, it is to be understood that the invention is not limited thereby, but is susceptible of changes in form and detail within the scope of the appended claims.

We claim:

1. In a camera utilizing film, the combination of a relatively fixed frame, a pressure plate normally spaced therefrom, means for advancing the film between said frame and plate, means for moving said plate to press the film against said frame, and differential pressure means on said plate for holding the film against it.

2. In a camera utilizing film, the combination of a relatively fixed frame, a pressure plate normally spaced therefrom, means for advancing the film between said frame and plate, means for moving said plate to press the film against said frame, suction means on said pressure plate for drawing the film against it, and means actuated in accordance with said movement of the plate for operating said suction means.

3. In a camera utilizing film, the combination of a relatively fixed frame, a pressure plate normally spaced therefrom, means for advancing the film between said frame and plate, means for moving said plate to press the film against said frame, differential pressure means for holding the film flatwise against said plate, and positioning means fixed relatively to said plate for holding said film out of contact with said frame and plate as it is advanced.

4. In a camera utilizing film, the combination of a relatively fixed frame, a pressure plate normally spaced therefrom, driving means, means actuated thereby for advancing the film between said frame and plate, means for moving said plate to press the film against said frame, suction means communicating with the face of said pressure plate for drawing the film against it, and mechanism actuated by said driving means in timed relation with said advancing means for actuating said suction means.

5. In a camera utilizing film, the combination of a relatively fixed frame, a pressure plate normally spaced therefrom, driving means, means actuated thereby for advancing the film between said frame and plate, means for moving said plate to press the film against said frame, suction means on said pressure plate for drawing the film against it, a valve for operating said suction means, and operative connections between said valve and said driving means for actuating said valve in accordance with the movement of said plate at the end of the film advancing operation.

6. In a camera utilizing film, the combination of a relatively fixed frame, a pressure plate normally spaced therefrom, driving means, means actuated thereby for advancing the film between said frame and plate, means for moving said plate to press the film against said frame, film measuring means for stopping said film advancing means, and differential pressure means actuated by said plate moving means for holding said film on the plate in its advanced position.

7. In a camera utilizing film, the combination of a relatively fixed frame, a pressure plate normally spaced therefrom, means for advancing the film between said frame and plate, means for moving said plate to press the film against said frame, film measuring means, and operative connections between said measuring means and said film advancing means for controlling the operation of the latter, and differential pressure means actuated by said plate moving means for holding said film on the plate in its advanced position.

8. In a camera utilizing film, the combination of a relatively fixed frame, a pressure plate cooperating therewith, means normally holding said plate in spaced relation to said frame, a film supply, film advancing means, guide means fixed relatively to said plate and cooperating with said advancing means for leading the film from said supply between said plate and frame out of contact therewith, and means for moving said pressure plate to press the film on said frame, and differential pressure means actuated by said plate moving means for holding said film on the plate in its advanced position.

9. In a camera utilizing film, the combination of a relatively fixed frame, a pressure plate cooperating therewith, means normally holding said plate in spaced relation to said frame, a film supply, guide means leading the film from said supply between said plate and frame and out of contact therewith, and means for moving said pressure plate to press the film on said frame, said guide means constituting rollers fixed at opposite sides of the frame opening, and differential pressure means actuated by said plate moving means for holding said film on the plate in its advanced position.

10. In a camera utilizing film, the combination of a film supply, a spool connected to the film, driving means for the spool for advancing the film from said supply to exposure position, a clutch between said driving means and the spool, means driven by said driving means for preparing said clutch for engagement, and means responsive to a predetermined position of said driving means for completing the engagement of said clutch.

11. In a camera utilizing film, the combination of a film supply, a spool connected to the film, driving means for the spool for advancing the film from said supply to exposure position, a clutch between said driving means and the spool, means controlled by said driving means for normally holding said clutch disengaged, and means responsive to a predetermined position of said driving means for releasing said holding means to effect engagement of said clutch to drive said spool.

12. In a camera utilizing film, the combination of a film supply, a spool connected to the film, driving means for the spool for advancing the film from said supply to exposure position, a clutch between said driving means and the spool, film measuring means driven by said film, operative connections between said measuring means and said clutch for disengaging the latter after a predetermined length of film has been advanced, a pressure plate for holding said film in advanced position, and connections between said pressure plate and said driving means for actuating said pressure plate at the end of the film-advancing operation.

13. In a camera utilizing film, the combination of a film supply, a spool connected to the film, driving means for the spool for advancing the film from said supply to exposure position, a clutch between said driving means and the spool, means actuated by said driving means for engaging said clutch to effect advance of said film, film measuring means, operative connections between said measuring means and said clutch for disengaging the latter upon advance of said film a predetermined amount, a pressure plate for holding said film in advanced position, and connections between said pressure plate and said driving means for actuating said pressure plate at the end of the film-advancing operation.

14. In a camera utilizing film, the combination of a film supply, a spool connected to the film, driving means for the spool for advancing the film from said supply to exposure position, a clutch between said driving means and said spool, means normally holding said clutch disengaged, a pressure plate normally disengaged from the film, normally inoperative differential pressure means on said plate cooperating with said film to hold it in position for exposure, operative connections between said driving means and said pressure plate, means actuated by said driving means in accordance with the position of the film and plate for engaging said clutch to drive said film, and means actuated by said driving means in accordance with the position of the film and plate for operating said pressure means and restoring it to inoperative condition.

15. In a camera utilizing film, the combination of a film supply, a spool connected to the film, driving means for the spool for advancing the film from said supply to exposure position, a clutch between said driving means and the spool, means normally holding said clutch disengaged, means actuated by said driving means for disabling said holding means, film measuring means actuated in accordance with the advance of the film by said driving means, operative connections between said measuring means and said holding means whereby the latter is released to disengage said clutch upon advance of a predetermined length of film, a pressure plate for holding said film in advanced position, and connections between said pressure plate and said driving means for actuating said pressure plate at the end of the film-advancing operation.

16. In a camera utilizing film, the combination of a film supply, driving means for advancing the film from said supply to exposure position, a clutch between said driving means and the film, means normally holding said clutch disengaged, means actuated by said driving means for disabling said holding means, film measuring means actuated in accordance with the advance of the film by said driving means, operative connections between said measuring means and said holding means, whereby the latter is released to disengage said clutch upon advance of a predetermined length of film, a pressure plate for holding said film in exposure position, and connections between said pressure plate and said driving means for actuating said pressure plate at the end of the film advancing operation.

17. In a camera utilizing film, the combination of a film supply, driving means for advancing the film from said supply to exposure position, a clutch between said driving means and the film, means normally holding said clutch disengaged, means actuated by said driving means for disabling said holding means, film measuring means actuated in accordance with the advance of the film by said driving means, operative connections between said measuring means and said holding means whereby the latter is released to disengage said clutch upon advance of a predetermined length of film, a pressure plate for holding said film in exposure position, a vacuum back therefor, and means actuated by said driving means for operating said vacuum back at the end of the film advancing operation to hold the film flat for exposure.

ERWIN C. WEIBLEN.
IRVING W. DOYLE.